(12) United States Patent
Grell

(10) Patent No.: US 12,427,903 B2
(45) Date of Patent: Sep. 30, 2025

(54) PACKAGE HANDLING SYSTEM AND METHODS OF USE

(71) Applicant: Mathew L. Grell, Norcross, GA (US)

(72) Inventor: Mathew L. Grell, Norcross, GA (US)

( * ) Notice: Subject to any disclaimer, the term of this patent is extended or adjusted under 35 U.S.C. 154(b) by 346 days.

(21) Appl. No.: 18/308,744

(22) Filed: Apr. 28, 2023

(65) Prior Publication Data

US 2023/0347804 A1 Nov. 2, 2023

Related U.S. Application Data

(60) Provisional application No. 63/363,856, filed on Apr. 29, 2022.

(51) Int. Cl.
*B60P 1/00* (2006.01)
*B60P 3/00* (2006.01)
*B64U 20/00* (2023.01)
*B64U 101/64* (2023.01)

(52) U.S. Cl.
CPC ...... *B60P 1/00* (2013.01); *B60P 3/00* (2013.01); *B64U 20/00* (2023.01); *B64U 2101/64* (2023.01)

(58) Field of Classification Search
CPC .... B60P 1/00; B60P 3/00; B60P 3/007; B64U 2101/60; B64U 2101/64
See application file for complete search history.

(56) References Cited

U.S. PATENT DOCUMENTS

| | | | |
|---|---|---|---|
| 11,440,456 B1* | 9/2022 | Willison | B60T 7/122 |
| 12,291,333 B1* | 5/2025 | Theobald | B64D 1/10 |
| 2020/0175471 A1* | 6/2020 | Tsuruta | G06Q 10/0838 |
| 2021/0327012 A1* | 10/2021 | Issing | G05D 1/0217 |
| 2022/0281371 A1* | 9/2022 | Meador | G06Q 10/02 |
| 2024/0391375 A1* | 11/2024 | Colucci | B60P 1/649 |
| 2024/0424972 A1* | 12/2024 | Moser | B64U 70/93 |

* cited by examiner

*Primary Examiner* — Kaitlin S Joerger
(74) *Attorney, Agent, or Firm* — Mathew L. Grell, Esq.; Grell & Watson Patent Attorneys LLC

(57) ABSTRACT

A package handling system for delivery of a widget ordered and destined for a delivery stop on a delivery route, includes one or more delivery packages affixed in series to a package feed tape, a feed tape mechanism, said feed tape mechanism configured to engage said package feed tape to propel said package feed tape and said one or more delivery packages affixed thereto, a tape cutter to cut said package feed tape to separate at least one delivery package from said one or more delivery packages, a drone platform positioned proximate said tape cutter, and a drone having a drone feed tape capture system to receive said package feed tape and said at least one delivery package of said one or more delivery packages affixed to said package feed tape, and thus, provides non-person delivery of packages.

20 Claims, 10 Drawing Sheets

PACKAGE HANDLING SYSTEM AND METHODS OF USE

FIELD OF THE DISCLOSURE

The present disclosure is directed to delivery of packages. More specifically, the present disclosure is directed to a system to bundle packages at warehouse, deliver by truck to curb, and drone to porch.

BACKGROUND

Logistics and e-commerce era package delivery entails regional warehouses of products in storage ready for purchase and quick delivery to customer designated address. More specifically, these warehouses are massive and highly organized facilities that house millions of products across hundreds of categories. These products are managed and processed by proprietary software, which allows for rapid fulfillment and delivery of orders. Once a customer places an order, the warehouse staff quickly locates the relevant product and prepares it for shipment. These businesses rely on an extensive logistics network for its delivery operations, including trucking, delivery vehicles and last-mile delivery services. This allows logistics and e-commerce businesses to offer a wide range of shipping speeds, from same-day delivery to standard shipping times of just a few days. Overall, these warehouse and delivery operations are incredibly efficient and well-run.

One disadvantage with conventional warehouse systems is packages are not linked together in order of delivery from first delivery to last delivery for a given vehicle route requiring drivers to select delivery packages at each stop.

Another disadvantage with conventional delivery is if drones are utilized the drone must enter the enclosed vehicle, identify the package to be delivered, pick the package up, and maneuver out of the enclosed vehicle to deliver the package.

Therefore, it is readily apparent that there is a recognizable unmet need for a package handling system and methods of use that may be configured to address at least some aspects of the problems discussed above.

SUMMARY

Briefly described, in an example embodiment, the present disclosure may overcome the above-mentioned disadvantages and may meet the recognized need for package handling system and methods of use may include a truck and drone delivery system having one or more drones, a delivery truck, the delivery truck having one or more drone platforms. The delivery truck may include one or more catch bins or containers to catch undeliverable packages and/or used battery packs. The drone platforms may include at least a pair of spaced apart landing pads for the one or more drones. The truck or bins may house and transport at least one set of delivery packages affixed in series to a feed tape according to a sequence in a delivery route (delivery package feed tape mechanism and tape cutter). The feed tape may be fed into a feed tape mechanism and tape cutter. A microprocessor or controller controls feed tape mechanism (such as with drive wheels) and tape cutter may be engaged based on the position in a route (GPS) via a reader reading a code, such as a bar code on the feed tape or delivery package and confirms package delivery and GPS location or position. Drone lands on drone pad. Processor or controller detects drone is in positions on drone platform. The feed tape mechanism gripping(s) the feed tape and propels the feed tape and delivery package (n) to the drone platform and preferably between the pair of spaced apart landing pads. Drone with tape capture mechanism receives feed tape and delivery package (n) in its drone tape capture mechanism. Drone communicates to Processor or controller that feed tape and delivery package (n) is secure in drone tape capture mechanism. Processor or controller initiates tape cutter to cut feed tape segment of delivery package (n) from remaining feed tape. Drone lifts off drone pad and delivers feed tape segment and delivery package (n) to addressed delivery location (n), such as front door, garage (drone trigger garage to open & close), porch, drop box, or other designated location. Drone returns to drone platform to pick up feed tape and delivery package (n+1). Delivery truck moves to address (n+1). Repeat.

Alternate embodiment drone platform and delivery package feed tape mechanism and tape cutter may be positioned in an interior of the delivery truck.

Alternate embodiment drone platform and delivery package feed tape mechanism and tape cutter may be positioned on a container or bin and may be on a pallet that a fork truck moves into an interior or platform of the delivery truck.

Accordingly, in another aspect, the present disclosure may include a battery pack replacement system. The battery pack replacement system may include one or more drones, a delivery truck, the delivery truck having one or more drone platforms. The delivery truck may include one or more catch bins or containers to catch used batteries. The truck or bins may house at least one set of drone replacement batteries (battery pack) affixed in series to a feed tape. The feed tape may be fed into a drone battery feed tape mechanism and tape cutter. A microprocessor or controller controls drone battery feed tape mechanism and tape cutter based on drone power levels. Drone lands on drone pad. Processor or controller detects drone is in positions on drone platform and drone is low on power. The drone battery feed tape mechanism and tape cutter gripping(s) the feed tape and propels the feed tape and drone battery (n) to the drone platform. Drone with battery tape capture mechanism receives feed tape and drone battery (n) in its drone battery tape capture mechanism. Drone communicates to Processor or controller that feed tape and drone battery (n) is secure in drone battery tape capture mechanism. Drone may be powered via drone platform contact leads during drone battery swap out time period. Old or spent drone battery (n−1) is pushed from drone battery receiver by drone battery tape capture mechanism and drops or is captured in catch bin to catch discarded drone batteries and new battery (n) is inserted into drone battery receiver.

Accordingly, in another aspect, the present disclosure may include feed tape and delivery package fill system. Feed tape and delivery package fill system may be utilized to fill and seal the packages and affix to a feed tape or fill and seal the packages affixed in series to a feed tape according to delivery route using a delivery package feed tape mechanism to position each package in a loading terminal to enable the drone or robot to place or drop purchased item(s) into a package according to a delivery route. Then print and affix labels and codes such as bar codes to the package. These functions may occur in a warehouse or factory.

In an exemplary embodiment of a package handling system for delivery of a widget ordered and destined for a delivery stop on a delivery route, having one or more delivery packages affixed in series to a package feed tape, a feed tape mechanism, the feed tape mechanism configured to engage the package feed tape to propel the package feed tape and the one or more delivery packages affixed thereto, a tape cutter to cut the package feed tape to separate at least one delivery package from the one or more delivery packages, a drone platform positioned proximate the tape cutter, and a drone having a drone feed tape capture system to receive the package feed tape and the at least one delivery package of the one or more delivery packages affixed to the package feed tape.

In a second exemplary embodiment of an a battery handling system, having one or more batteries affixed in series to a battery feed tape, a battery feed tape mechanism, the battery feed tape mechanism configured to engage the battery feed tape to propel the battery feed tape and the one or more batteries affixed thereto, a tape cutter to cut the battery feed tape to separate at least one battery from the one or more batteries, a drone platform positioned proximate the tape cutter, and a drone having a drone feed tape capture system to receive the battery feed tape and the at least one battery from the one or more batteries affixed to the battery feed tape.

In a third exemplary embodiment of an envelope filling system, having one or more envelopes affixed in series to a feed tape, the feed tape having a series of feed apertures, a feed tape mechanism, the feed tape mechanism configured to engage the series of feed apertures of the feed tape to propel the feed tape and the one or more envelopes affixed thereto, a tape cutter to cut feed tape to separate one or more envelopes from the one or more envelopes, a robotic arm positioned proximate the feed tape mechanism, and at least one collection of widgets positioned proximate the robotic arm wherein the robotic arm picks a designated widget associated with a delivery address in a sequence of a delivery route and places the designated widget in an envelope from the one or more envelopes to form a delivery package in a sequence of delivery packages.

It is an object of the disclosure herein to enable drone pickup and delivery of one or more packages destined for an address from multiple packages affixed in series to a feed tape.

It is an object of the disclosure herein to reduce manpower cost in a warehouse and delivery personnel to deliver packages.

It is an object of the disclosure herein to enable swap out spent drone battery/batteries with a new battery/batteries from multiple drone batteries affixed in series to a feed tape automatically while on the drone platform.

A feature of the present disclosure includes the advantage of using truck and drone delivery system drones to deliver package. Drones can significantly reduce delivery times, as they can travel directly to the customer's doorstep from the truck rather than relying on high cost human ground transportation methods. This means that customers can receive their packages much faster and at lower costs, which can be especially beneficial for time-sensitive deliveries.

A feature of the present disclosure includes the advantage of using battery pack replacement system enables field replacement of drone battery systems significantly reduce delivery times by keeping drones in operation verses stopping to charge drone battery systems.

A feature of the present disclosure includes the advantage of using feed tape and delivery package fill system where packages are affixed to a tape feed in sequence matching delivery stops along a delivery route. Packages affixed to a tape feed in sequence matching delivery stops along a delivery route can significantly reduce delivery times and reduce incorrect deliveries. This means that customers can receive their packages much faster and more accurately, which can be especially beneficial for time-sensitive deliveries.

A feature of the present disclosure includes using drones for delivery of packages can also help to lower delivery costs. Traditional delivery methods often require multiple personnel and vehicles to make a single delivery, which can be costly and time-consuming. Drones, robots, and self-driving vehicles on the other hand, have low overhead operating costs and can make deliveries more efficiently and quickly.

A feature of the present disclosure includes packages affixed in series to a feed tape according to delivery route.

A feature of the present disclosure includes a delivery package feed tape mechanism and tape cutter.

A feature of the present disclosure includes a drone platform with spaced landing pads.

A feature of the present disclosure includes a drone with drone or package tape capture mechanism.

A feature of the present disclosure includes drone battery pack(s) affixed in series to a battery feed tape.

A feature of the present disclosure includes drone battery feed tape mechanism and tape cutter.

A feature of the present disclosure includes a catch bin to catch discarded drone batteries or undeliverable packages.

These and other features of package handling system and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present disclosure for package handling system and methods of use will be better understood by reading the Detailed Description of the Preferred and Selected Alternate Embodiments with reference to the accompanying drawing Figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures, specific terminology is employed for clarity. The present disclosure, however, is not intended to be limited to the specific terminology selected; it is to be understood that each specific element includes all technical equivalents that operate in a similar manner to accomplish similar functions. Embodiments of the claims may, however, be embodied in many different forms and should not be construed as limited to the embodiments set forth herein. The examples set forth herein are non-limiting examples, and are merely examples among other possible examples. It is recognized herein that the optimum dimensional relationships, to include variations in size, materials, shape, form, position, connection, function and manner of operation, assembly and use, are intended to be encompassed by the present disclosure.

Figure 1:
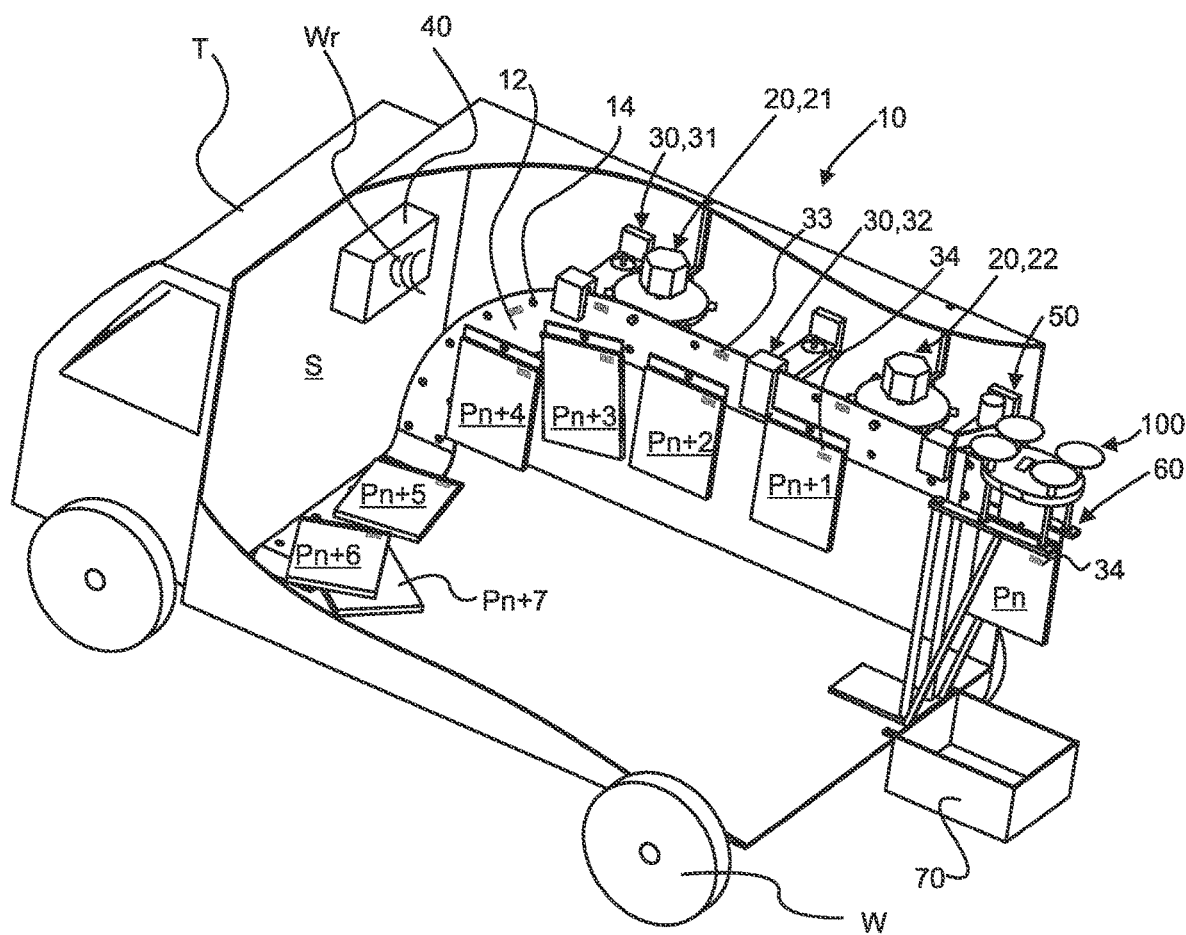
FIG. 1 is a perspective cutout view of a delivery truck transporting one or more packages, destined for an address as delivery package (Pn) and addresses for delivery package (Pn+1, Pn+2 . . . . ), from multiple packages affixed in series to a feed tape, a feed tape mechanism and cutter, a drone platform, a catch bin, according to select embodiments of the instant disclosure.
Figure 2:
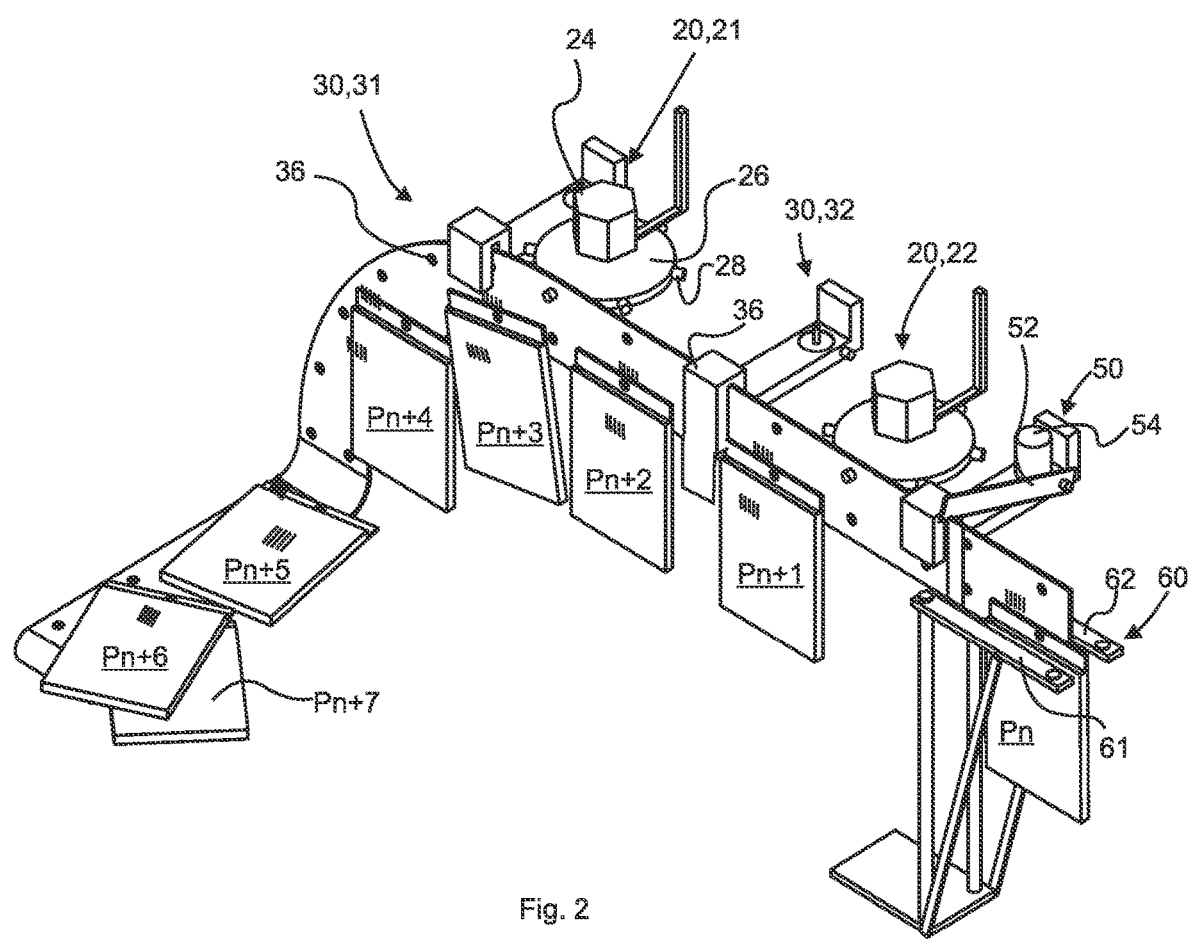
FIG. 2 is a perspective view of feed tape mechanism for one or more packages and tape cutter shown with feed tape fed into feed tape mechanism holding in series delivery package (Pn) and delivery package (Pn+1, Pn+2 . . . . ), tape cutter, and a drone platform, according to select embodiments of the instant disclosure.
Figure 3:
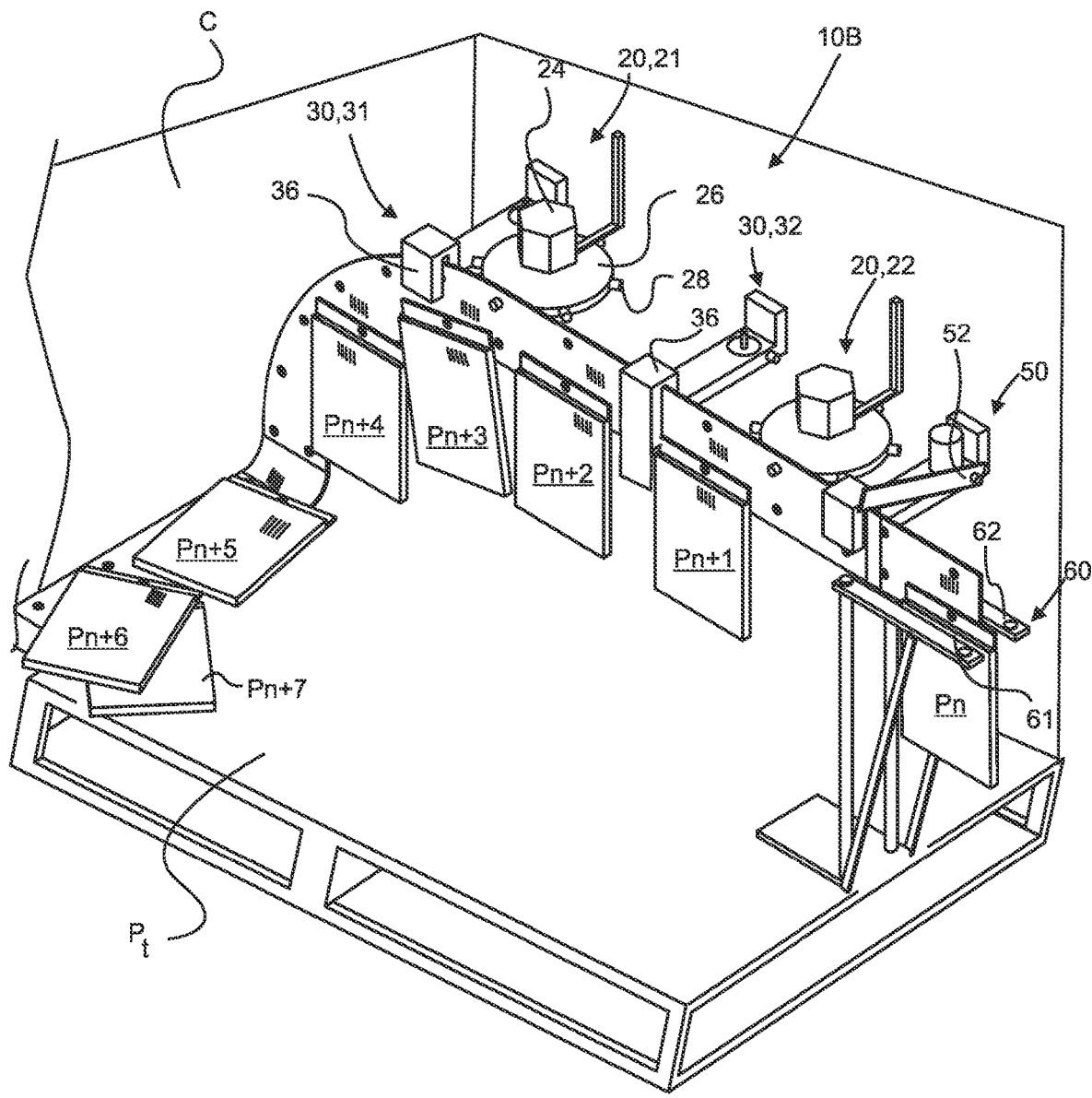
FIG. 3 is a perspective view of feed tape mechanism for one or more packages and tape cutter shown with feed tape fed into feed tape mechanism holding in series delivery package (Pn) and delivery package (Pn+1, Pn+2 . . . . ), tape cutter, and a drone platform, according to select embodiments of the instant disclosure, shown in a container on a palate.

Referring now to FIGS. 1, 2, and 3, there is illustrated a preferred embodiment of package handling system 10 integrated with manned or unmanned delivery vehicle, such as delivery truck T transporting one or more delivery packages P (each containing a product or widget Wn) or one or more sets of delivery packages P destined for a set of address on a route, such as delivery route DR having a series of package drops, such as delivery stops DS of one or more packages, such as delivery packages Pn, Pn+1, Pn+2, Pn+3, Pn+4, Pn+5, Pn+6, Pn+7, and so on affixed or removeably affixed in series to a package feed tape, such as package feed tape 12 being transported to individual addresses or delivery stops DS along delivery route DR. Each package P may contain an address or machine readable code 34, such as a bar code or RFID tag (package information) that can be scanned by code reader, such as package reader 30, 31, 32 to designate a section or segment of package feed tape 12, which has package P affixed thereto, and transmit such information to microprocessor or controller 40 to control delivery or hand off of packages P affixed to package feed tape 12 to drone platform 60.

Ribbon, such as package feed tape 12 may include a plurality of holes, rows of, gripping teeth, or series of feed tape apertures 14 and one or more delivery packages P may be affixed or removeably affixed in series to package feed tape 12 or one or more delivery packages P may be pivotably affixed or removeably affixed in series to package feed tape 12. Package feed tape 12 (or feed tape 12) may contain an address or machine readable code 33, such as bar code or RFID tag (package information) that can be scanned by machine code reader, such as tape reader 30, 31, 32 and transmitted to microprocessor or controller 40 to control, determine, delineate delivery of packages P affixed to package feed tape 12 to drone platform 60 or control, determine, delineate one delivery package P of one or more delivery packages Pn (Pn+1, Pn+2, Pn+3, Pn+4, Pn+5, Pn+6, Pn+7) affixed to package feed tape 12.

It is contemplated that in order to precisely drive package feed tape 12 then package feed tape 12 may be configured with a gripping surface to prevent slippage of feed tape drive mechanism.

Package feed tape 12 may be fed into feed tape mechanism 20, 21, 22 affixed to, for example, sidewall S of delivery truck T and configured to drive, push and pull, or move (to propel) feed tape 12 in preferably linear motion toward drone platform 60. Package feed tape 12 may be fed into feed tape mechanism 20 and tape cutter 50 to start the sequence of package feed tape 12. Moreover, package handling system 10 may include delivery microprocessor or controller 40 controls(ing) feed tape mechanism 20, 21, 22 having drive motor 24, connected to drive wheel 26, having for example plurality of pins or pegs 28 positioned on a perimeter of drive wheel 26 to engage feed tape apertures 14 of package feed tape 12 to feed delivery packages Pn, Pn+1, Pn+2, Pn+3, Pn+4, Pn+5, Pn+6, Pn+7 to drone platform 60 and unmanned aerial vehicle, such as drone 100 according to a sequence in delivery route DR and pre-loaded with contents according to such sequence of delivery stops DS in a delivery route DR of delivery truck T (delivery stop sequence).

Microprocessor or controller 40 to control(s) feed tape mechanism 20, 21, 22 based on predetermined delivery route DR of delivery truck T route (confirmed by GPS location or position) and sequence, or series of delivery packages Pn, Pn+1, Pn+2, Pn+3, Pn+4, Pn+5, Pn+6, Pn+7 being pre-loaded with widgets Wn according to such delivery sequence of delivery stops DS in delivery route DR of delivery truck T (delivery stop sequence) and confirmed by microprocessor or controller 40, which controls package reader 30, 32, tape reader 30, 31 having machine code reader 36 positioned proximate or close in distance package feed tape 12 to enable reading of machine readable code 33, 34, feed tape mechanism 20, 21, 22 and together with delivery truck T, GPS location or position and sequence in delivery stops DS of delivery route DR to control, determine, or delineate one delivery package P of delivery packages Pn (Pn+1, Pn+2, Pn+3, Pn+4, Pn+5, Pn+6, Pn+7) to be delivered to delivery stops DS in delivery route DR.

It is contemplated herein that feed tape mechanism 20, 21, 22 may be utilized in a reverse feed via feed tape mechanism 20, 21, 22 to automatically load delivery truck T with delivery packages Pn, Pn+1, Pn+2, Pn+3, Pn+4, Pn+5, Pn+6, Pn+7 being pre-loaded with widgets Wn according to such delivery sequence of delivery stops DS in delivery route DR of delivery truck T.

Package handling system 10 may further include tape separator or tape cutter 50 having cutter mechanism 52 and drive mechanism 54 positioned proximate or close in distance package feed tape 12. Microprocessor or controller 40 controls tape cutter 50 based on predetermined delivery truck T route (confirmed by GPS location or position), delivery stops DS of delivery route DR, and sequence of series of delivery packages Pn, Pn+1, Pn+2, Pn+3, Pn+4, Pn+5, Pn+6, Pn+7 being pre-loaded with contents, such as widget Wn, according to such sequence of delivery stops DS of delivery route DR of delivery truck T and confirmed by delivery microprocessor or controller 40, which controls tape cutter 50 to cut, separate, release, or sever, for example, delivery package Pn from delivery packages Pn+1, Pn+2, Pn+3, Pn+4, Pn+5, Pn+6, Pn+7 to enable transfer of delivery package Pn to unmanned aerial vehicle, such as drone 100, which may be configured to pick up package Pn, and thereafter respectively next Pn+1 from Pn+2, Pn+3, Pn+4, Pn+5, Pn+6, Pn+7 and so on in sequence and deliver each delivery package Pn to such sequence of delivery stops DS of delivery route DR of delivery truck T (delivery stop sequence).

Package handling system 10 may further include one or more unmanned aerial vehicle platforms, such as drone platform 60, preferably having pair of spaced apart landing pads 61, 62 to enable delivery package Pn to be sequentially delivered one by one or combinations of delivery packages Pn and Pn+1 by microprocessor or controller 40, feed tape mechanism 20, and tape cutter 50 between landing pads 61, 62 positioned proximate or close in distance to feed tape mechanism 20, and tape cutter 50. Microprocessor or controller 40 controls tape cutter 50 based on predetermined delivery truck T route (confirmed by GPS location or position) and sequence of series of delivery packages Pn, Pn+1, Pn+2, Pn+3, Pn+4, Pn+5, Pn+6, Pn+7 being pre-loaded with contents, such as widget Wn, according to such sequence of delivery stops DS of delivery route DR of delivery truck T and confirmed by microprocessor or controller 40 controls tape cutter 50 to cut, separate, release, or sever, for example, delivery package Pn from delivery packages Pn+1, Pn+2, Pn+3, Pn+4, Pn+5, Pn+6, Pn+7 to enable unmanned aerial vehicle, such as drone 100 to pick up of package Pn, and thereafter respectively next Pn+1 from Pn+2, Pn+3, Pn+4, Pn+5, Pn+6, Pn+7 and so on in sequence therefrom landing pads 61, 62 to deliver delivery packages Pn in sequence to delivery stops DS of delivery route DR of delivery truck T (delivery stop sequence).

It is contemplated that delivery truck T may include a container, such as catch bin 70 affixed to delivery truck T to enable drone 100 to deposit package Pn that is not deliverable (undeliverable) so delivery truck T and drone 100 can move on to the next delivery stop DS for delivery package Pn+1.

It is contemplated herein in FIG. 3 that package handling system 10B may be housed in or on packager or container C and positioned on palate Pt or just positioned on palate Pt for moving via a fork truck to load one or more package handling system 10B onto delivery truck T.

Figure 4A:
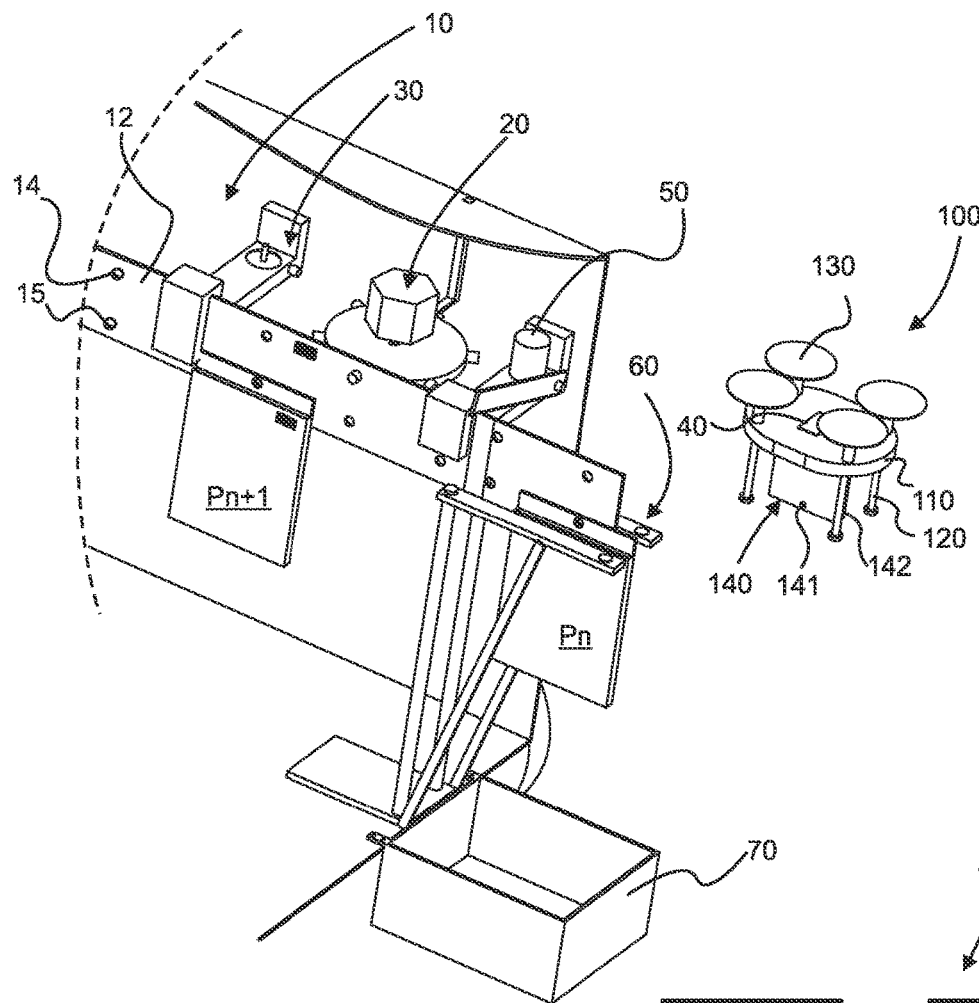
FIG. 4A is a perspective view of the drone in flight around drone platform of FIGS. 1-3, according to select embodiments of the instant disclosure.
Figure 4B:
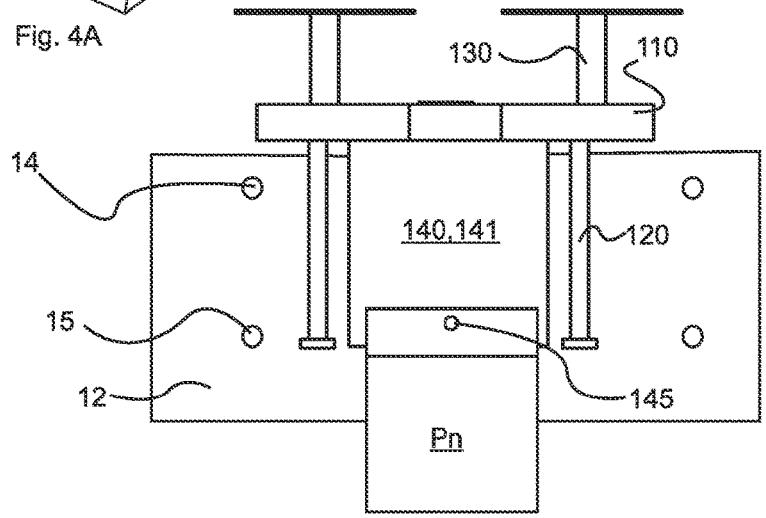
FIG. 4B is a side view of drone in flight carrying package in route to a delivery address transporting a package from the drone platform, according to select embodiments of the instant disclosure.

Referring now to FIGS. 1, 4A, and 4B, there is illustrated a preferred embodiment of one or more package handling system 10, one or more delivery platforms 60, and one or more drone 100. Drone 100 may include drone microprocessor or controller 40 to control navigation of drone 100 and communicate with delivery microprocessor or controller 40, preferably for short haul delivery of package Pn to address of delivery stops DS of delivery route DR of delivery truck T. Drone 100 may include body 110, landing structure(s) 120 connected to body 110 and two or more drive motors with power supplies and lift and guidance propellers 130 to navigate drone 100. Moreover, drone 100 may include drone feed tape capture system 140, such as slotted feed tape receiver, preferably affixed to body 110 or landing structure(s) 120. Drone feed tape capture system 140 may include a slotted tape receiver, such as gapped or spaced apart first receiver member 141 and second receiver member 142 with catch pin 145 or the like to insert therein feed tape apertures 14 of feed tape 12 or secure feed tape 12 therein to secure package Pn to drone feed tape capture system 140 of drone 100 for transport and drop off to delivery stops DS of delivery route DR of delivery truck T.

First step, drone 100 lands on drone pad 60 as shown in FIG. 1. Delivery microprocessor or controller 40 detects drone 100 is in positions on drone platform 60 or drone 100 communicates same to delivery microprocessor or controller 40. Next step, package handling system 10 feeds or moves package feed tape 12 through feed tape mechanism 20 and feed tape mechanism 20 moves or pushes or pulls package feed tape 12 to drone platform 60 and preferably between pair of spaced apart landing pads 61, 62 into drone feed tape capture system 140. Where drone feed tape capture system 140 grips or slides catch pin 145 in to feed tape apertures 14 of package feed tape 12 to secure package Pn to drone feed tape capture system 140 of drone 100.

Drone 100 communicates to delivery microprocessor or controller 40 of package handling system 10 that feed tape and delivery package Pn is secure in drone feed tape capture system 140. Delivery microprocessor or controller 40 initiates tape cutter 50 to cut, separate, release, or sever, for example, package Pn from Pn+1, Pn+2, Pn+3, Pn+4, Pn+5, Pn+6, Pn+7 and so on.

Drone 100 transports package Pn to addressed delivery location, delivery stops DS of delivery route DR from delivery truck T via drone navigation algorithm, such as navigation to front door, garage (drone trigger garage to open & close), porch, drop box, or other designated delivery location and releases catch pin 145 to deposit package Pn there. Drone 100 navigates and returns to drone platform 60 to pick up package Pn+1 next. Delivery truck T moves to next address location Pn+1. Repeat for Pn+2, Pn+3, Pn+4, Pn+5, Pn+6, Pn+7 and so on in sequence (delivery stop sequence).

Figure 5:
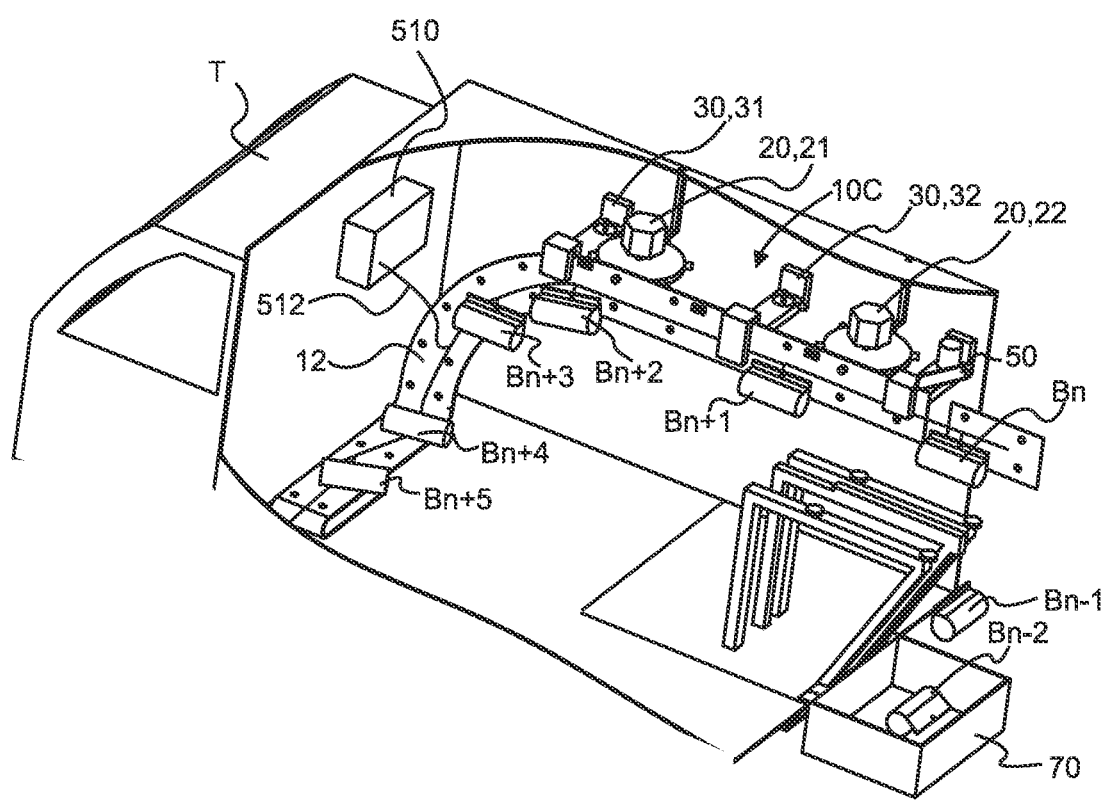
FIG. 5 is a perspective cutout view of a delivery truck transporting one or more batteries, battery (Bn) and batteries (Bn+1, Bn+2 . . . . ) to power drone(s) affixed in series to a feed tape, a feed tape mechanism and cutter, drone battery feed tape capture system, a drone platform, a catch bin, according to select embodiments of the instant disclosure.
Figure 5A:
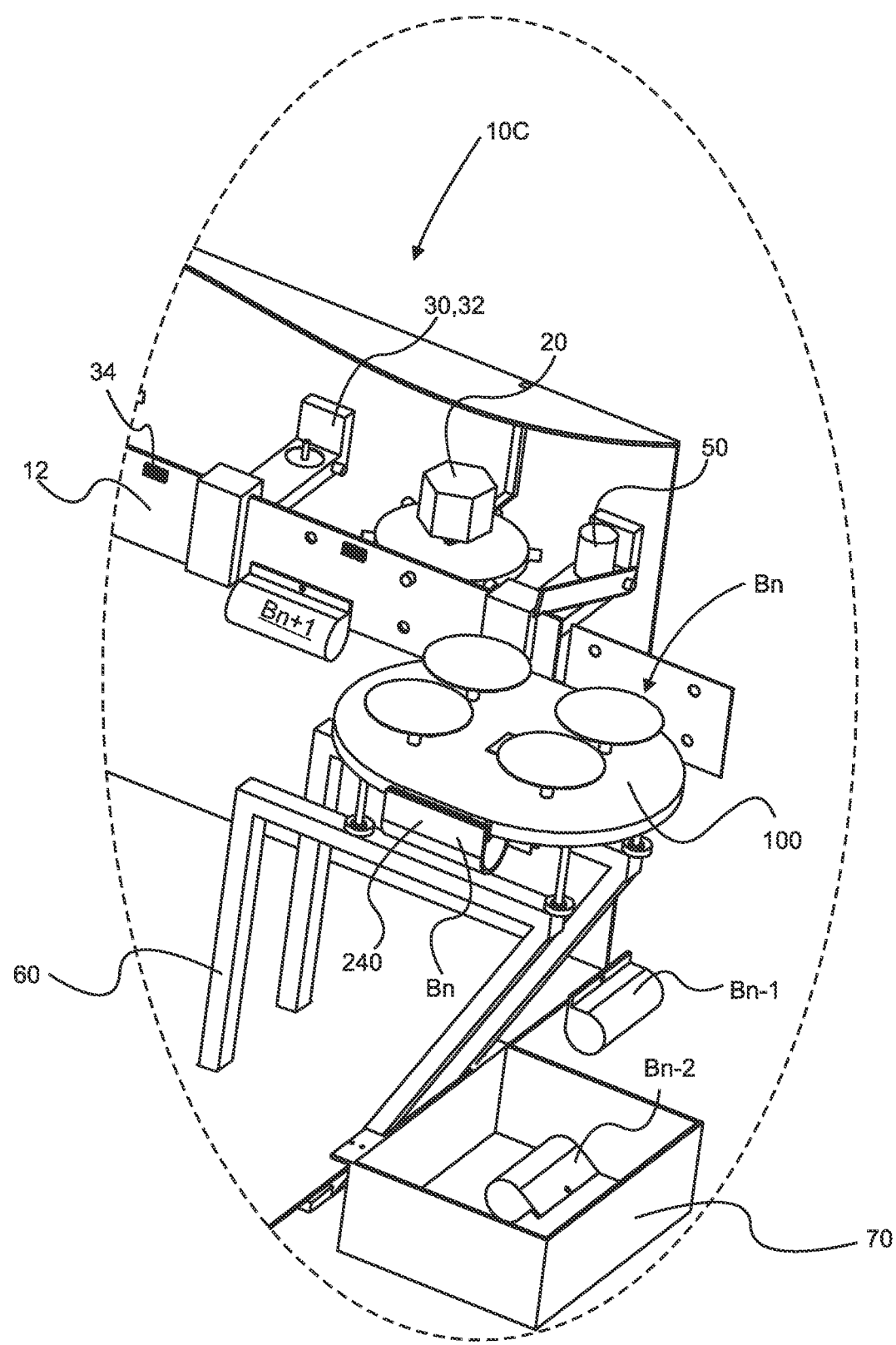
FIG. 5A is a perspective view of feed tape mechanism for one or more batteries and tape cutter shown with feed tape fed into feed tape mechanism holding in series one or more batteries, battery (Bn) and batteries (Bn+1, Bn+2 . . . . ) to power drone(s), tape cutter, and a drone platform, according to select embodiments of the instant disclosure.
Figure 5B:
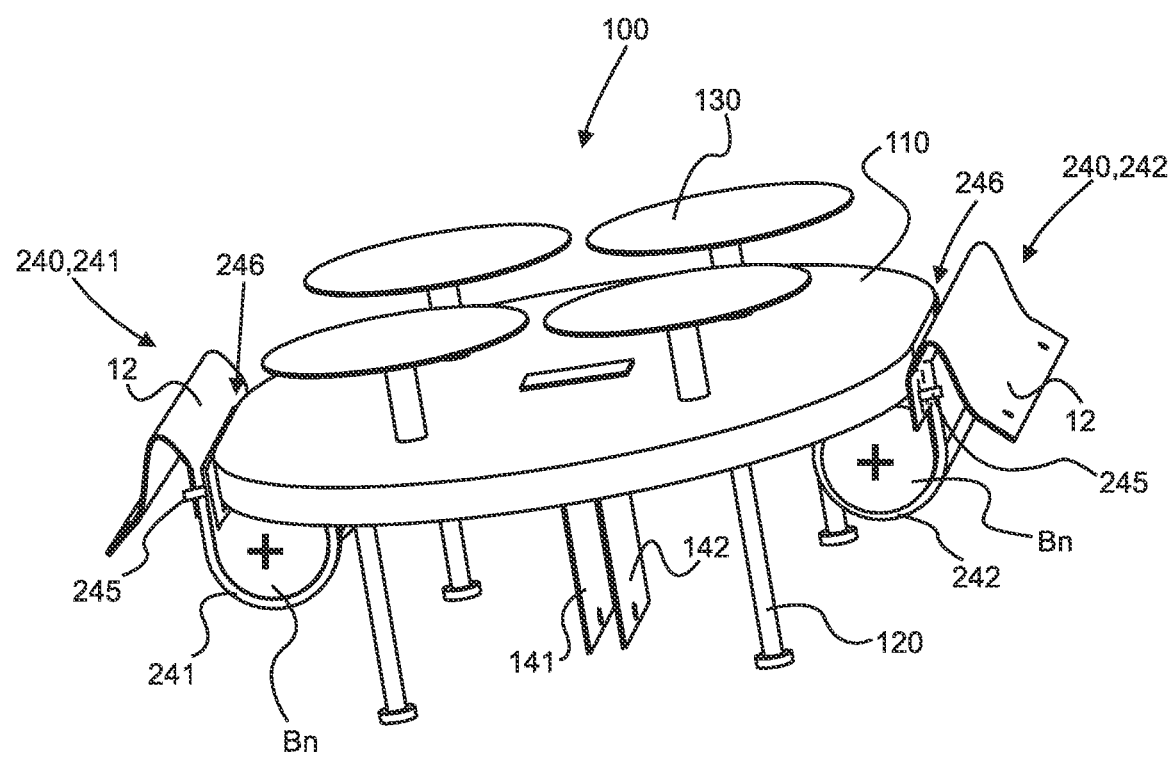
FIG. 5B is a side view of drone in flight carrying with fresh set of batteries, according to select embodiments of the instant disclosure.

Referring now to FIGS. 5, 5A, and 5B, there is illustrated a preferred embodiment of one or more battery handling system 10C, one or more delivery platforms 60, and one or more drone 100. Battery handling system 10C having manned or unmanned delivery vehicle, such as delivery truck T transporting one or more drone battery packs, such as battery Bn, Bn+1, Bn+2 and so on affixed or removeably affixed in series to battery feed tape 12. Each battery B may contain machine readable code 34, such as bar code or RFID tag that can be scanned by code reader, such as battery reader 30, 32 and transmitted to microprocessor or controller 40 to control power supply to drone 100. Moreover, batteries Bn may be wired (electrically connected) together via wires 512 running along battery feed tape 12 to enable trickle charging via charger 510 so battery Bn, Bn+1, Bn+2 and so on remain in a state of full charge.

Drone 100 may include microprocessor or controller 40 to control(s) to control navigation of drone 100, short haul delivery of package Pn to address and communicate with delivery truck T. Drone 100 may include body 110, landing structure(s) 120 connected to body 110 and two or more drive motors and lift and guidance propellers 130 to navigate drone 100. Drone 100 may connect to auxiliary power, such as via charger 510 via platform 60 when docking. Moreover, drone 100 may include one or more drone battery feed tape capture system 240 preferably affixed to body 110 or landing structure(s) 120. Drone battery feed tape capture system 240 may include at least one battery receiver, or such as spaced apart first battery receiver 241 and second battery receiver 242 with catch pin 245 or the like to insert therein feed apertures 14 of battery feed tape 12 to secure battery Bn to drone feed tape capture system 140 (slotted battery receiver) of drone 100. It is contemplated at least one battery receiver, or such as spaced apart first battery receiver 241 and second battery receiver 242 may include receiver slot 246 to receive battery feed tape 12.

First step, drone 100 lands on drone pad 60 as shown in FIG. 1. Microprocessor or controller 40 detects drone 100 is in positions on drone platform 60 or drone 100 communicates same to microprocessor or controller 40 that drone power is low (low power). Next step, battery handling system 10C feeds, pushes or pulls, or moves battery feed tape 12 through battery feed tape mechanism 20 and battery feed tape mechanism 20 moves or pushes or pulls battery feed tape 12 to drone platform 60 and preferably into or through drone battery feed tape capture system 240. Where drone battery feed tape capture system 240 grips or slides catch pin 245 into feed tape apertures 14 of battery feed tape 12 to secure battery Bn to drone battery feed tape capture system 240 of drone 100 to supply drone 100 with newly charged battery system. Spent battery Bn−1 is pushed from at least one battery receiver, drone battery feed tape capture system 240, or such as spaced apart first battery receiver 241 and second battery receiver 242 and drops spent battery Bn−1 into catch bin 70 positioned below drone platform 60.

It is contemplated herein that drone 100 may have two or more batteries Bn and that drone 100 may service one set and then rotate thereon platform 60 to enable service of other set(s) of batteries Bn. Furthermore, first battery receiver 241 and second battery receiver 242 may be formed to make a partial or full enclosure therearound battery Bn.

It is contemplated herein that drone 100 may have two or more batteries Bn and that drone 100 may service two or more batteries Bn simultaneously via two battery handling system 10C.

Drone 100 communicates to microprocessor or controller 40 of package handling system 10 that battery feed tape 12 and delivered battery Bn is secure in drone battery feed tape capture system 240. Microprocessor or controller 40 initiates tape cutter 50 to cut, separate, release, or sever, for example, battery Bn from batteries Bn+1, Bn+2, on battery feed tape 12 and so on.

Drone 100 returns to service to transports package Pn to addressed delivery location via drone navigation algorithm, such as navigation to front door, garage (drone trigger garage to open & close), porch, drop box, or other designated delivery location and releases catch pin 145 to deposit package Pn. Drone 100 navigates and returns to drone platform 60 to pick up package Pn+1. Delivery truck T moves to next address location Pn+1. Repeat.

It is contemplated herein that battery handling system 10C may be independent of delivery truck T and be one or more standalone battery exchange station for one or more drones 100. Such system may be utilized in a factory, warehouse, shipping department, on a separate delivery truck T, spaced apart stations in specified areas (city) or campus, farm, ranch, business, or the like.

Figure 6:
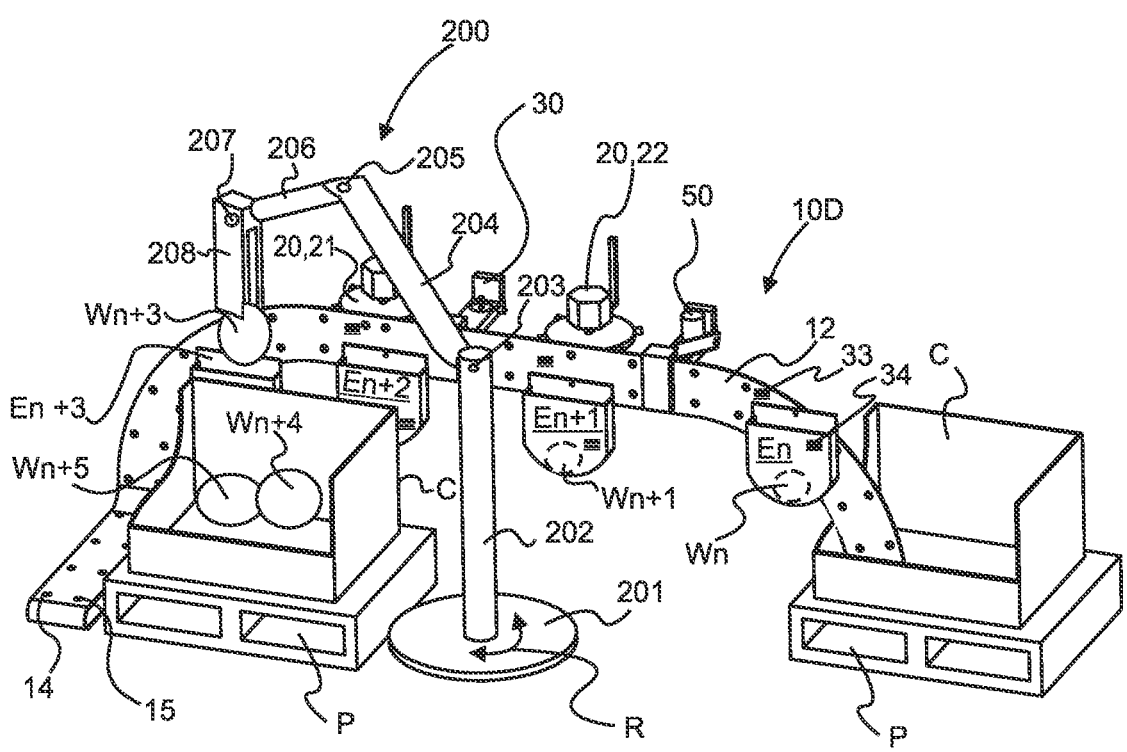
FIG. 6 is an exploded view of feed tape mechanism and tape cutter shown with feed tape fed into feed tape mechanism holding in series delivery envelopes (En), and tape cutter, robot, or robotic arm to stuff envelope En and envelopes (En+1, En+2 . . . . ) with customer purchased content, such as collection of widgets Wn and widgets (Wn+1, Wn+2 . . . . ) to make delivery package (Pn) and delivery packages (Pn+1, Pn+2 . . . . ) for delivery to designated addresses in a route, according to select embodiments of the instant disclosure.

Referring now to FIG. 6, there is illustrated a preferred embodiment of envelope handling system 10C having one or more envelopes E or one set of delivery envelopes E such as delivery envelopes En, En+1, En+2, En+3, and so on affixed or removeably affixed in series to envelope feed tape 12 for transport to individual addresses or delivery stops DS of delivery route DR of delivery truck T. Each envelop E may contain an address or a machine readable code 34, such as bar code or RFID tag that can be scanned by code reader, such as package reader 30 and transmitted to microprocessor or controller 40 to control loading of widgets W into envelope E to become packages Pn. It is contemplated herein that addressed envelope E, of one or more envelopes E or one set of delivery envelopes E such as delivery envelopes En, En+1, En+2, En+3, and so on, may include an address or machine readable code 34 associated with a delivery address in a sequence of delivery stops DS of delivery route DR of delivery truck T(delivery stop sequence).

Envelope handling system 10C may include drones 100 or robotic devices, such as robotic arm 200 having base 201, vertical extension arm 203 to raise and lower gripper hand 208 as well as rotate gripper hand 208 about rotation R, one or more extension arms, such as first extension arm 204 pivotably connected to vertical extension arm 202, and second extension arm 206 pivotably connected to first extension arm 204 to enable precise positioning of gripper hand 208, and gripper hand 208 rotationally connected to second extension arm 206 to enable identification, such as (selecting a product, such as widget Wn ordered by a customer with address or machine readable code 34 associated with a delivery address in a sequence of delivery stops DS of delivery route DR of delivery truck T) and picking of designated widget(s) Wn from container C (on a palate) or conveyor belt and placing designated widget(s) Wn in envelope En as feed tape 12 traverses its course to form package(s) Pn.

Delivery stops Dn corresponds to envelope En having therein widget Wn to form package Pn positioned on feed tape 12 for delivery in sequence to address An corresponding to delivery stops DS of delivery route DR of delivery truck T.

It is contemplated herein that robotic arm may be a drone, robot, or like unmanned widget Wn picker.

Envelope handling system 10C may utilize robotic arm 200 to pick designated widget Wn associated with delivery address in a sequence of delivery stops DS of delivery route DR of delivery truck T and place designated widget Wn in envelope En of one or more envelopes En, En+1, En+2, En+3, and so on to form delivery package Pn in a sequence of delivery packages Pn, Pn+1, Pn+2, Pn+3, Pn+4, Pn+5, Pn+6, Pn+7 affixed to tape feed 12 according to a sequence of delivery stops DS of delivery route DR of delivery truck T (delivery stop sequence). Next, feed tape mechanism 20 propels feed tape 12 and one or more envelopes En to position next envelope En+1 from one or more envelopes En+1, En+2, En+3 and so on proximate or close in distance robotic arm 200. Robotic arm 200 picks next designated widget Wn+1 associated with a next delivery address in a sequence of delivery stops DS of delivery route DR of delivery truck T and places next designated widget Wn+1 in an envelope En+1 from one or more envelopes En+1, En+2, En+3 and so on to form a next delivery package Pn+1 in a sequence of delivery packages Pn, Pn+1, Pn+2, Pn+3, Pn+4, Pn+5, Pn+6, Pn+7 and so on. Repeat to form in sequence delivery packages Pn, Pn+1, Pn+2, Pn+3, Pn+4, Pn+5, Pn+6, Pn+7 associated with a series of delivery address in a sequence of delivery stops DS of delivery route DR of delivery truck T (delivery stop sequence).

Figure 7:
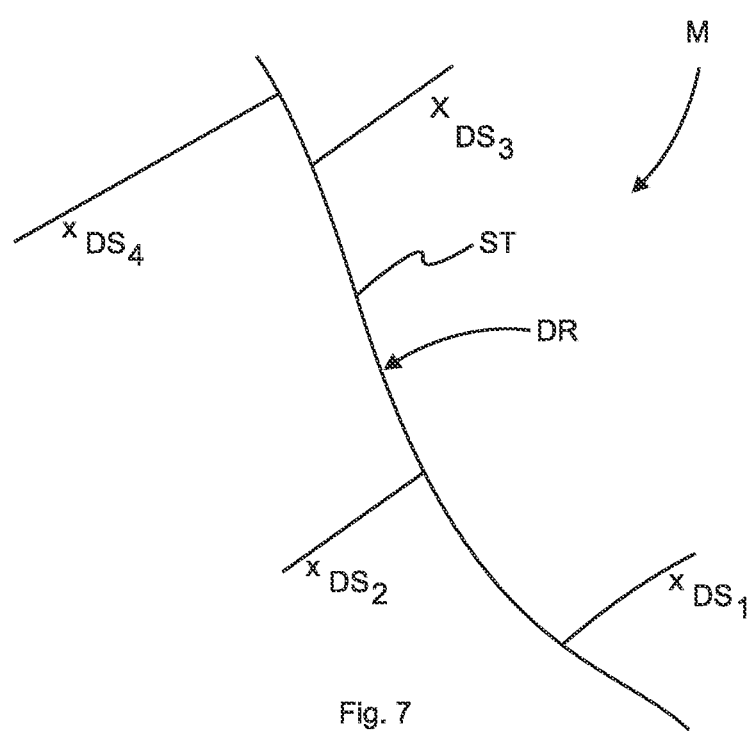
FIG. 7 is a map of a delivery route having a series of delivery stops associated with designated delivery packages for each stop or address in a sequence of a delivery route.

Referring now to FIG. 7, there is illustrated a preferred embodiment of a map M of a delivery route DR having a series of delivery stops DSn (DS1) for delivery of package Pn containing widget Wn, DSn+1(DS2) for delivery of package Pn+1 containing widget Wn+1, DSn+2(DS3) for delivery of package Pn+2 containing widget Wn+2, DSn+3(DS4) for delivery of package Pn+3 containing widget Wn+3 (addresses) associated with designated delivery packages Pn, Pn+1, Pn+2, Pn+3, having delivery contents, such as widgets Wn, Wn+1, Wn+2, Wn+3, ordered by customers Cn, Cn+1, Cn+2, and Cn+3 associated with the series of delivery stops DS of delivery route DR of delivery truck T.

Figure 8:
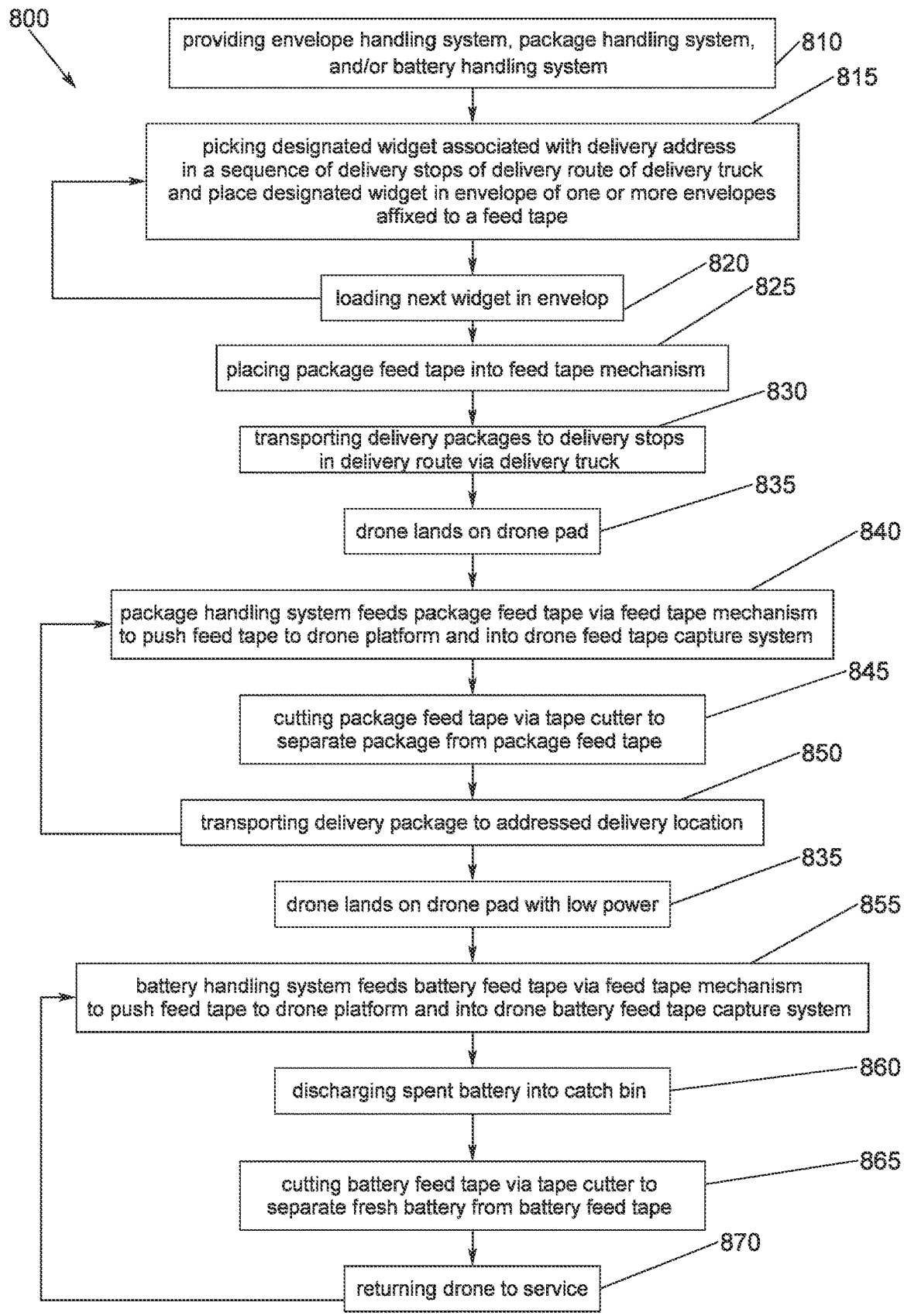
FIG. 8 is a flowchart.

Referring now to FIG. 8, there is illustrated a flow diagram 800 of a method of operation and use of envelope handling system 10D, package handling system 10, package handling system 10B, and/or battery handling system 10C. In block or step 810, providing envelope handling system 10D, package handling system 10, package handling system 10B, and/or battery handling system 10C as described above in FIGS. 1-7. In block or step 815, utilizing robotic arm 200 to pick(ing) designated widget Wn associated with delivery address in a sequence of delivery stops DS of delivery route DR of delivery truck T and place designated widget Wn in envelope En of one or more envelopes En, En+1, En+2, En+3, and so on to form delivery package Pn in a sequence of delivery packages Pn, Pn+1, Pn+2, Pn+3, Pn+4, Pn+5, Pn+6, Pn+7 affixed to package tape feed 12 according to a sequence of delivery stops DS of delivery route DR of delivery truck T. In block or step 820, loading next widget Wn+1 in envelope En+1 and repeat until delivery packages Pn, Pn+1, Pn+2, Pn+3, Pn+4, Pn+5, Pn+6, Pn+7 have been filled (delivery stop sequence).

In block or step 825, placing package feed tape 12 into feed tape mechanism 20, 21, 22 and configured to drive, push and pull, or move (to propel) package feed tape 12 in preferably linear motion toward drone platform 60.

In block or step 830, transporting delivery packages Pn, Pn+1, Pn+2, Pn+3, Pn+4, Pn+5, Pn+6, Pn+7 to delivery stops DS in delivery route DR of delivery truck T, such as delivery stops DSn (DS1) for delivery of package Pn containing widget Wn.

In block or step 835, landing drone 100 on drone platform 60.

In block or step 840, picking delivery packages Pn via package handling system 10 feeds or moves package feed tape 12 through feed tape mechanism 20 and feed tape mechanism 20 moves or pushes or pulls package feed tape 12 to drone platform 60 and preferably between pair of spaced apart landing pads 61, 62 into drone feed tape capture system 140. Where drone feed tape capture system 140 grips or slides catch pin 145 in to feed tape apertures 14 of package feed tape 12 to secure package Pn to drone feed tape capture system 140 of drone 100.

In block or step 845, cutting package feed tape 12 via tape cutter 50 to cut, separate, or sever, for example, delivery package Pn from Pn+1, Pn+2, Pn+3, Pn+4, Pn+5, Pn+6, Pn+7 and so on.

In block or step 850, transporting delivery package Pn to addressed delivery location, delivery stops DS of delivery route DR from delivery truck T via drone 100 carrying delivery package Pn to addressed delivery location, delivery stops DS of delivery route DR from delivery truck T. Repeat for Pn+1, Pn+2, Pn+3, Pn+4, Pn+5, Pn+6, Pn+7 and so on (delivery stop sequence).

In block or step 835, landing drone 100 on drone platform 60.

In block or step 855, loading fresh battery into drone 100 via battery handling system 10C feeds, pushes or pulls, or moves battery feed tape 12 through feed tape mechanism 20 and feed tape mechanism 20 moves or pushes or pulls battery feed tape 12 to drone platform 60 and preferably into or through drone battery feed tape capture system 240.

In block or step 860, discharging spent battery into catch bin via spent battery Bn−1 is pushed from at least one battery receiver, drone battery feed tape capture system 240, or such as spaced apart first battery receiver 241 and second battery receiver 242 and drops spent battery Bn−1 into catch bin 70 positioned below drone platform 60.

In block or step 865, cutting battery feed tape 12 via tape cutter 50 to cut, separate, release, or sever, for example Bn from Bn+1, Bn+2 and so on. Repeat for Bn+1, Bn+2 and so on.

Concerning the description herein, it is to be realized that the optimum dimensional relationships, including variations in size, materials, shape, form, configuration, position, connection, function and manner of operation, assembly and use, are intended to be encompassed by the present disclosure.

It is further understood herein that the parts and elements of this disclosure may be located or positioned elsewhere based on one of ordinary skill in the art without deviating from the present disclosure.

The foregoing description and drawings comprise illustrative embodiments. Regarding the described exemplary embodiments, it should be noted by those skilled in the art that the disclosures within are exemplary only, and that various other alternatives, adaptations, and modifications may be made within the scope of the present disclosure. Merely listing or numbering the steps of a method in a particular order does not constitute any limitation on the order of the steps of that method. Many modifications and other embodiments will come to mind for one skilled in the art this disclosure pertains to, having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A package handling system for delivery of a widget ordered and destined for a delivery stop on a delivery route, said system comprising:
   one or more delivery packages affixed in series to a package feed tape;

a feed tape mechanism, said feed tape mechanism configured to engage said package feed tape to propel said package feed tape and said one or more delivery packages affixed thereto;

a tape cutter to cut said package feed tape to separate at least one delivery package from said one or more delivery packages;

a drone platform positioned proximate said tape cutter; and a drone having a drone feed tape capture system to receive said package feed tape and said at least one delivery package of said one or more delivery packages affixed to said package feed tape.

2. The system of claim 1, wherein said package handling system is positioned on a delivery truck.

3. The system of claim 2, wherein said package handling system is affixed to a sidewall of said delivery truck.

4. The system of claim 2, wherein each said one or more delivery packages affixed to said package feed tape is pre-loaded in sequence with the widget ordered according to the delivery stop in the delivery route of said delivery truck.

5. The system of claim 2, wherein said package feed tape is configured with a machine readable code to delineate a section of said package feed tape that corresponds to the widget ordered according to the delivery stop in the delivery route of said delivery truck.

6. The system of claim 2, wherein said delivery package is configured with a machine readable code to designate said delivery package of said one or more delivery packages affixed to said package feed tape.

7. The system of claim 5, further comprising a machine code reader positioned proximate said package feed tape to enable reading of said machine readable code on said package feed tape.

8. The system of claim 6, further comprising a controller to determine a GPS location of said delivery truck, the delivery stop in the delivery route of said delivery truck, and each said one or more delivery packages affixed to said package feed tape.

9. The system of claim 1, said package feed tape further comprising a series of feed tape apertures, wherein said feed tape mechanism is configured to engage said series of feed tape apertures.

10. The system of claim 9, wherein said feed tape mechanism further comprising a drive motor, connected to a drive wheel, said drive wheel having a plurality of pins or pegs positioned on a perimeter of said drive wheel to engage said series of feed apertures of said package feed tape.

11. The system of claim 8, wherein said controller controls said feed tape mechanism and said cutter.

12. The system of claim 1, wherein said drone platform is configured with a pair of spaced apart landing pads to enable said feed tape and said one or more delivery packages affixed thereto to be sequentially delivered therebetween.

13. The system of claim 9, wherein said drone further comprising a body, a landing structure connected to said body, two or more drive motors with power supplies, and lift and guidance propellers to navigate said drone.

14. The system of claim 13, wherein said drone feed tape capture system further comprising a slotted tape receiver.

15. The system of claim 14, wherein said slotted tape receiver further comprising spaced apart first receiver member and second receiver member with a catch pin therebetween to insert therein one of said feed tape apertures of said package feed tape to secure at least one of said one or more delivery packages to said drone.

16. The system of claim 10, wherein said controller initiates said tape cutter to cut said package feed tape to release at least one delivery package from said one or more delivery packages.

17. The system of claim 10, wherein said drone delivers at least one delivery package from said one or more delivery packages to the delivery stop on the delivery route.

18. The system of claim 1, wherein said package handling system is positioned on a palate.

19. A battery handling system, said system comprising:

one or more batteries affixed in series to a battery feed tape;

a battery feed tape mechanism, said battery feed tape mechanism configured to engage said battery feed tape to propel said battery feed tape and said one or more batteries affixed thereto;

a tape cutter to cut said battery feed tape to separate at least one battery from said one or more batteries;

a drone platform positioned proximate said tape cutter; and a drone having a drone feed tape capture system to receive said battery feed tape and said at least one battery from said one or more batteries affixed to said battery feed tape.

20. The system of claim 19, further comprising a charger electrically connected to said one or more batteries.

* * * * *